(12) United States Patent
Vajo

(10) Patent No.: US 7,157,166 B2
(45) Date of Patent: Jan. 2, 2007

(54) AMMONIA FUEL CELL

(75) Inventor: John J. Vajo, West Hills, CA (US)

(73) Assignee: HRL Laboratories, LLC, Malibu, CA (US)

( * ) Notice: Subject to any disclaimer, the term of this patent is extended or adjusted under 35 U.S.C. 154(b) by 375 days.

(21) Appl. No.: 10/739,725

(22) Filed: Dec. 17, 2003

(65) Prior Publication Data

US 2004/0253492 A1  Dec. 16, 2004

Related U.S. Application Data

(60) Provisional application No. 60/478,450, filed on Jun. 13, 2003.

(51) Int. Cl.
*H01M 8/04* (2006.01)
*H01M 8/18* (2006.01)
*H01M 8/10* (2006.01)
*H01M 4/86* (2006.01)

(52) U.S. Cl. ............... 429/17; 429/19; 429/30; 429/40

(58) Field of Classification Search ............ 429/30, 429/19, 17, 40
See application file for complete search history.

(56) References Cited

U.S. PATENT DOCUMENTS

| | | | |
|---|---|---|---|
| 3,134,697 A * | 5/1964 | Niedrach ............ | 429/30 |
| 3,222,223 A * | 12/1965 | Platner .............. | 429/26 |
| 3,730,774 A * | 5/1973 | McKee et al. ...... | 429/17 |
| 4,704,267 A | 11/1987 | DiMartino ........... | 423/648 |
| 5,055,282 A | 10/1991 | Shikada et al. ..... | 423/351 |
| 5,976,723 A | 11/1999 | Boffito et al. ...... | 429/17 |
| 2002/0021995 A1 | 2/2002 | Balachandran et al. | 423/237 |

OTHER PUBLICATIONS

Ammonia: The Key to a Hydrogen Economy Ammonia Fuel Cells systems, Ganley, Jason C., Howard University, Department of Chemical Engineering, Washing, DC , 2005, pp. 1-23, http:\\www.energy.iastate.edu/renewable/biomass/download/2005/Ganley_fuelcell.pdf.*

Direct Ammonia Fuel Cells for Distributed Power Generation and CHP, McFarlan, A., Maffei, N., and Pelletier, L., presented at "Ammonia-The Key to a Hydrogen Economy" Argonne National laboratories, Oct. 13, 2005, pp. 1-23, http:\\www.energy.iastate.edu/renewable/biomass/download/2005/McFarlan_fuelcell.pdf.*

Faleschini, G., et al., "Ammonia For High Density Hydrogen Storage," INTERNET: <http://www.electricauto.com/HighDensity_STOR.htm> pp. 1-4 (Sep. 12, 2000).

Iwahara, H., "Technological Challenges In the Application of Proton Conducting Ceramics," *Solid State Ionics*, pp. 289-298 (1995).

(Continued)

*Primary Examiner*—Patrick Joseph Ryan
*Assistant Examiner*—Thomas H. Parsons
(74) *Attorney, Agent, or Firm*—Ladas & Parry LLP

(57) ABSTRACT

This invention refers to generating electrical energy comprising an ammonia fuel cell for generating electrical energy including a catalyst being in contact with a high temperature proton conducting membrane and the catalyst comprising at least one decomposition catalyst which causes $NH_3$ to decompose to $N_2$ and $H_2$ and at least one catalytic anode which dissociates and ionizes $H_2$ into $H^+$ and electrons, the fuel cell further including at least one catalytic cathode for reaction of $H^+$, electrons and oxygen to form $H_2O$, an external circuit from the catalytic anode to the catalytic cathode, an ammonia source for introducing ammonia into the fuel cell, a gas exit for $N_2$, and an oxygen source.

13 Claims, 2 Drawing Sheets

OTHER PUBLICATIONS

Kordesch, K., et al., "Alkaline Fuel Cells Applications," presented at the 3rd International Fuel Cell Conference, Nagoya, Japan, INTERNET: <http://www.electricauto.com/Nagoya_1999.htm>.

Lin, Y.S., et al., "Hydrogen Energy and Solid State Fuel Cells," *Ionics*, vol. 4, No. 5 & 6, pp. 444-450 (1998).

Norby, T., "Solid-State Protonic Conductors: Principles, Properties, Progress, and Prospects," *Solid State Ionics*, pp. 1-11 (1999).

Steele, B.C.H., "Material Science and Engineering: The Enabling Technology For the Commercialisation of Fuel Cell Systems," *Journal of Materials Science*, pp. 1053-1068 (2001).

Zhu, B., et al., "Intermediate Temperature Fuel Cells with Electrolytes Based on Oxyacid Salts," *Journal of Power Sources*, pp. 289-293 (1994).

* cited by examiner

AMMONIA FUEL CELL

CROSS REFERENCE TO RELATED APPLICATIONS

This application claims the benefit of U.S. Provisional application Ser. No. 60/478,450 filed on Jun. 13, 2003, which is incorporated herein by reference in its entirety.

BACKGROUND

The present invention relates to an ammonia fuel cell, especially to a fuel cell that directly utilizes ammonia as a fuel without prior treatment to decompose the ammonia and remove traces of undecomposed ammonia. This fuel cell produces electrical energy based on the partial oxidation reaction $$NH_3 + \frac{3}{4}O_2 \rightarrow \frac{1}{2}N_2 + \frac{3}{2}H_2O.$$

A polymer exchange membrane (PEM) $H_2/O_2$ fuel cell is an example of a fuel cell for widespread commercial application. However, highly pure hydrogen must be delivered to a PEM $H_2/O_2$ fuel cell. Sources of hydrogen with high gravimetric and volumetric density are also needed. This need is most acute for mobile applications. Physical storage as compressed gas or liquid can achieve gravimetric densities of approximately 10 weight percent. Both compressing and liquefying hydrogen are technologically difficult and use up a sizeable fraction (by up to approximately 30%) of the stored hydrogen's energy. Chemical storage as metal hydrides can achieve only 1–8 weight percent. Ammonia contains approximately 17 weight percent hydrogen. Ammonia is therefore attractive as a hydrogen source for PEM $H_2/O_2$ fuel cells. Hydrogen can be obtained from ammonia separate from the fuel cell via the decomposition reaction $$NH_3 \rightarrow \frac{1}{2}N_2 + \frac{3}{2}H_2.$$

This reaction is endothermic and consumes approximately 13% of the energy in the ammonia. However, this reaction requires high temperatures of 400–1000° C. PEM $H_2/O_2$ fuel cells typically run at 80° C. The difference between the ammonia decomposition temperature and the fuel cell temperature leads to inefficiencies. In practice, up to 40% of the energy in the ammonia can be used for the decomposition, which is significantly higher than the 13% theoretical loss noted above. Moreover, ammonia cannot be used directly in a PEM fuel cell because the ammonia would not decompose at the temperatures that PEM fuel cells operate and the undecomposed ammonia would poison the fuel cell catalyst.

Ammonia decomposition reactors have been developed to catalytically decompose ammonia into $N_2+H_2$. The $N_2+H_2$ mixture is subsequently fed into the anode of a $H_2/O_2$ fuel cell. However, a practical disadvantage is that any residual ammonia will poison the anode of a PEM fuel cell. Residual ammonia can result from an incomplete reaction or, depending on the decomposition temperature, from the decomposition equilibrium. Another disadvantage is that ammonia decomposition is endothermic and so energy must be continually supplied to a decomposition reactor to keep it at the required temperature. This results in a loss in efficiency for the fuel processing/fuel cell system as a whole.

U.S. Pat. Nos. 5,055,282 and 5,976,723 disclose a method for cracking ammonia into hydrogen and nitrogen, comprising exposing an ammonia cracking catalyst to ammonia under conditions effective to produce nitrogen and hydrogen, wherein said ammonia cracking catalyst contains an alloy having the general formula $Zr_{1-x}Ti_xM_1M_2$, wherein $M_1$ and $M_2$ are selected independently from the group consisting of Cr, Mn, Fe, Co, and Ni, and x is in the range from 0.0 to 1.0 inclusive, and between about 20% by weight and about 50% by weight of Al. The disclosures of U.S. Pat. Nos. 5,055,282 and 5,976,723 are hereby incorporated herein by reference.

U.S. Patent Application No. 2002/0021995 discloses an apparatus and method for decomposing $NH_3$. A fluid containing $NH_3$ is passed in contact with a tubular membrane that is a homogeneous mixture of a ceramic and a first metal, with the ceramic being selected from one or more of a cerate having the formula of $M'Ce_{1-x}M_x"O_{3-\delta}$, zirconates having the formula $M'Zr_{1-x}M_x"O_{3-\delta}$, stannates having the formula $M'Sn_{1-x}M_x"O_{3-\delta}$, where M' is a group IIA (Be, Mg, Ca, Sr, Ba, Ra) metal, M" is a dopant metal of one or more of Ca, Y, Yb, In, Nd, Gd or mixtures thereof and $\delta$ is a variable depending on the concentration of dopant and is in the range of from 0.001 to 0.5, the first metal is an element selected from the group consisting of Pt, Ag, Pd, Fe, Co, Cr, Mn, V, Ni, Au, Cu, Rh, Ru, Os, Ir and mixtures thereof. The tubular membrane has a catalytic metal on the side thereof in contact with the fluid containing $NH_3$ which is effective to cause $NH_3$ to decompose to $N_2$ and $H_2$. When the $H_2$ contacts the membrane $H^+$ ions are formed which pass through the membrane driving the $NH_3$ decomposition toward completion. What is needed is an ammonia fuel cell for generating electrical energy.

SUMMARY

This invention satisfies the above needs. A novel ammonia fuel cell for generating electrical energy is provided. A preferred version of the ammonia fuel cell of this invention includes a catalyst being in contact with a high temperature proton conducting membrane and the catalyst comprising at least one decomposition catalyst, which causes $NH_3$ to decompose to $N_2$ and $H_2$, and at least one catalytic anode, which dissociates and ionizes $H_2$ into $H^+$ and electrons, the fuel cell further includes at least one catalytic cathode for the reaction of $H^+$, electrons and oxygen to form $H_2O$, an external circuit from said catalytic anode to said catalytic cathode, an ammonia source for introducing ammonia into the fuel cell, a gas exit for $N_2$, and an oxygen source.

Another preferred aspect of the invention is a process of generating electrical energy in an ammonia fuel cell, wherein
   (a) ammonia flows to a decomposition catalyst being in contact with a high temperature proton conducting membrane,
   (b) ammonia decomposes to nitrogen and hydrogen,
   (c) hydrogen atoms dissociate into electrons and protons,
   (d) nitrogen gas exits the fuel cell,
   (e) the electrons flow to an external circuit,
   (f) the protons diffuse to a catalytic cathode where water is formed.

The ammonia fuel cell and the process of generating electrical energy in the fuel cell includes the steps of partially oxidizing ammonia to nitrogen and water. Decomposition of ammonia yields adsorbed nitrogen and hydrogen atoms. Pairs of adsorbed nitrogen atoms combine to form nitrogen molecules. The nitrogen molecules desorb forming nitrogen gas. Nitrogen gas exits the fuel cell. The adsorbed hydrogen atoms dissociate into electrons and protons. The electrons flow to an external circuit and the protons diffuse through the ceramic membrane to a catalytic cathode. Water is formed at the cathode by reaction of oxygen, from an air or oxygen source, with the diffusing protons and electrons from the external circuit. The external circuit includes a load. Ammonia can be stored as a liquid at room temperature at <10 bar ($10^6$ Pa) and, if produced renewably, yields a non-carbon based energy cycle. A proton exchange membrane that operates at >400° C. enables direct use of ammonia in a fuel cell. Alternate embodiments of this invention include a direct ammonia molten carbonate fuel cell. Alternative embodiments to store ammonia include using adsorbents and chemical compounds containing coordinated ammonia. Possible absorbents include activated carbon, silica gel, and zeolites. Examples of such compounds with coordinated ammonia include $Cr(NH_3)_6Cl_3$, $Co(NH_3)_6Cl_3$, and $Ni(NH_3)_6Cl_2$.

BRIEF DESCRIPTION OF DRAWINGS

The features and advantages of this invention will become better understood with regard to the following description, appended claims, and accompanying drawings where:

DETAILED DESCRIPTION

Figure 1:
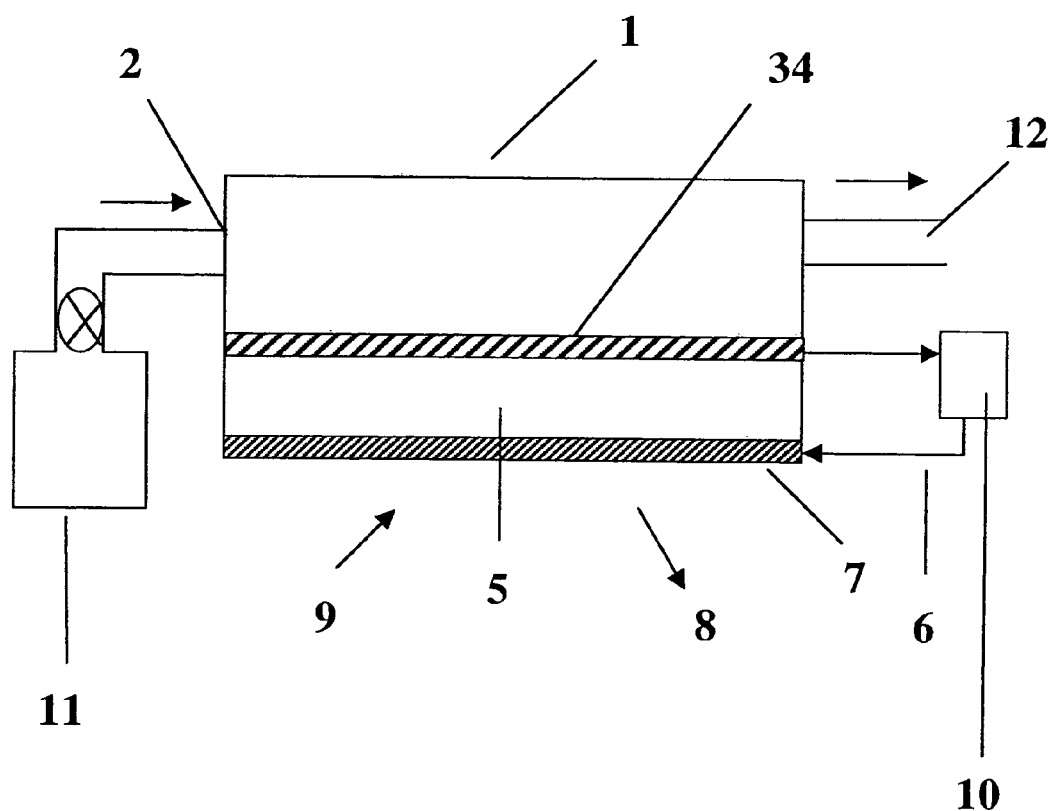
FIG. 1 is a cross-sectional view of the preferred embodiment of the ammonia fuel cell which includes an entrance for ammonia, one catalyst functioning as a decomposition catalyst and a catalytic anode being in contact with a high temperature proton conducting ceramic membrane, an external circuit and a load, a catalytic cathode, an air or oxygen source, and a nitrogen and water exhaust.
Figure 2:
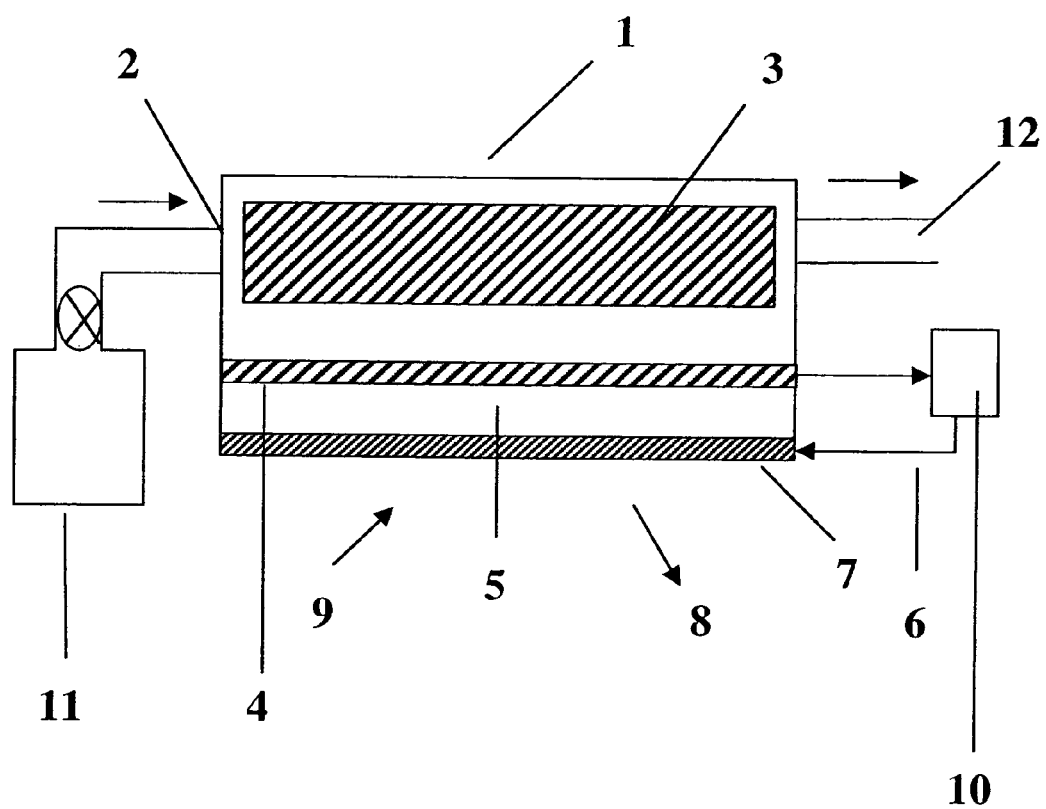
FIG. 2 is a cross-sectional view of a second preferred embodiment of the ammonia fuel cell, wherein decomposition catalyst and catalytic anode are separate catalysts.

The present invention is directed to an ammonia fuel cell which especially directly utilizes ammonia as a fuel without prior treatment to decompose the ammonia and remove traces of undecomposed ammonia, with reference to the drawings and in particular FIGS. 1 and 2, in which preferred embodiments of this invention are shown. This invention may be embodied in many different forms and should not be construed as limited to the embodiments set forth herein.

A fuel cell can provide electrical energy by electrochemically oxidizing fuels without combustion. Electrochemical oxidation avoids the inefficiencies associated with heat engines and the Carnot cycle. The purpose of this invention is to provide fuel cell based electrical energy in applications that require high energy density. The advantages are energy density, and fuel storage and utilization simplicity.

This invention applies to any ways involved with energy storage. Applications include mobile and small scale fuel cell power systems. Stationary applications include remote locations where emission free, fuel cell based energy is desired and the high energy density of ammonia can mitigate fuel transportation costs.

This invention provides a direct ammonia fuel cell comprising a catalytic anode, a proton conducting ceramic membrane, and a catalytic oxygen cathode. The overall reaction is the partial oxidation of ammonia.

$$NH_3 + \frac{3}{4}O_2 \rightarrow \frac{1}{2}N_2 + \frac{3}{2}H_2O.$$

Ammonia can be delivered from the vapor pressure in equilibrium with liquid ammonia, approximately <10 bar ($10^6$ Pa) at room temperature.

The catalytic materials for the anode can be selected from any of the formulations designed for ammonia decomposition such as those described in U.S. Pat. Nos. 5,055,282 and 5,976,723, disclosed above. Typically, these catalysts comprise mixtures of early transition metals together with various group VIIIb elements. Reasonable reaction rates have been achieved at 400° C.–1000° C. The anode must also function as a current collector in order to supply electrons to an external circuit. This requirement can be accomplished by mixing the catalytic material with a conducting metal also usually a group VIIIb element. Techniques for producing these structures are analogous to those used in solid oxide fuel cells.

Some examples of anode materials are given below:
1. Raney nickel
2. Ni—NiO
3. Pt paste
4. porous Pt and mixtures thereof (see B. Zhu and B.-E. Mellander, "Intermediate Temperature Fuel Cells with Electrolytes Based on Oxyacid Salts," J. Power Sources, vol 52, 289–293 (1994) and H. Iwahara, "Technological Challenges in the Applications of Proton Conducting Ceramics," Solid State Ionics, vol 77, 289–298 (1995) and U.S. Pat. No. 2002/0021995, the disclosures of which are hereby incorporated herein by reference).

To facilitate transfer of protons from the catalytic anode to the high temperature proton conducting membrane, the membrane material, such a described below, may be incorporated into the anode as a mixture.

The anode is supported on a proton conducting ceramic membrane. This membrane can be selected from any of a group of ceramics developed for high temperature proton conduction. Several recent examples include those developed for high temperature $H_2/O_2$ fuel cells. Examples are cerates, zirconates, and stannates of group IIA metals and doped perovskites.

Proton conducting membranes can be any of many protonic conductors (see H. Iwahara, "Technological Challenges in the Applications of Proton Conducting Ceramics," Solid State Ionics, vol 77, 289–298 (1995), T. Norby, "Solid-State Protonic Conductors: Principles, Properties, Progress and Prospects," Solid State ionics, vol 125, 1–11 (1999) and Y. S. Lin, X. Qi, M. Pam, and G. Meng, "Hydrogen Energy and Solid State Fuel Cells," Ionics, vol 4, 444–450 (1998), the disclosures of which are hereby incorporated herein by reference). The protonic conductors differ in conductivity, which is ideally high; in the variation in conductivity with temperature; in their electron and oxide ion conductivities, which are ideally low; and in their chemical stability, which is ideally high. The choice is dictated by desired operating temperature and the current/voltage characteristics. They can be produced by standard techniques e.g. starting from oxides, carbonates, or hydroxides with milling, sintering, and pressing. Solgel techniques are an alternative. The structure can be a homogeneous monolithic plate, disk or tube. It can also be a composite with a electrochemically inert ceramic (alumina, zirconia)

powder or a porous foam. This structure might be used to improve strength. Another possibility is a layered structure composed of two or more different electrolyte materials. In this case thin layers of more chemically inert material can be used on the outside of a less stable material. The thickness depends on conductivity and desired operating current voltage characteristics (see B. C. H. Steele, "Material Science and Engineering: The Enabling Technology for the Commercialization of Fuel Cell Systems," J. Materials Science, vol 36 1053–1068 (2001) The disclosures of which are hereby incorporated herein by reference). For good performance the thickness (T in cm) and the conductivity (sigma in Ohm/cm) are related as T/sigma=0.15 Ohm/cm$^2$.

Some examples for electrolytes are given below:

| | | |
|---|---|---|
| 1. $SrCe_{(1-x)}M_{(x)}O_{(3-\delta)}$ | | x = 0–0.2, preferably approximately 0.05 and M = Yb, Y, Sc, Eu, Sm, Ho, Tm, Tb |
| 2. $SrZr_{(1-x)}M_{(x)}O_{(3-\delta)}$ | | x = 0–0.2, preferably approximately 0.05 and M = Yb, Y, In, Al, Ga |
| 3. $BaCe_{(1-x)}M_{(x)}O_{(3-\delta)}$ | | x = 0–0.2, preferably approximately 0.1 and M = Ca, Y, La, Nd, Gd |
| 4. $BaZr_{(1-x)}Y_{(x)}O_{(3-\delta)}$ | | x = 0.1 |
| 5. $CaZr_{(1-x)}M_{(x)}O_{(3-\delta)}$ | | x = 0–0.2 and M = Sc, In, Ga |
| 6. $KTa_{(1-x)}Fe_{(x)}O_{(3-\delta)}$ | | x = 0–0.125 |
| 7. $M_{(1-x)}Ca_{(x)}ScO_{(3-\delta)}$ | | x = 0–0.2 and M = La, Nd, Sm, Gd |
| 8. $LaSc_{(1-x)}Mg_{(x)}O_{(3-\delta)}$ | | x = 0–0.2, preferably approximately 0.05 |
| 9. $BaPr_{(1-x)}Gd_{(x)}O_{(3-\delta)}$ | | x = 0–0.4 |
| 10. $Ba_{3(1-x)}K_{(x)}PO_{4(2-\delta)}$ | | x = 0–0.12, preferably approximately 0.03 |
| 11. $Li_2SO_4/Al_2O_3$ composite | | |
| 12. $RbNO_3/Al_2O_3$ composite | | |

δ is a variable which depends on the concentration of the dopant, but is greater than 0.001 and less than 0.5. Generally, the suitability of the proton conductivity ceramic component candidates will depend on the stability requirements of the fabricated homogeneous composite.

The cathode can be analogous to those used in solid oxide fuel cells or high temperature $H_2/O_2$ fuel cells. Oxygen can be delivered to the cathode from air or from a pressurized oxygen source.

A combined catalyst which functions as a decomposition catalyst and catalytic anode contains material as listed under anodes and electrolytes and mixtures thereof.

Some examples of cathodes are given below:
1. NiO—AgO
2. carbon paste
3. Ag paste
4. Pt paste
5. porous Pt and mixtures thereof (see B. Zhu and B.-E. Mellander, "Intermediate Temperature Fuel Cells with Electrolytes Based on Oxyacid Salts," J. Power Sources, vol 52, 289–293 (1994), 2. H. Iwahara, "Technological Challenges in the Applications of Proton Conducting Ceramics," Solid State Ionics, vol 77, 289–298 (1995), the disclosures of which are hereby incorporated herein by reference).

To facilitate transfer of protons from the proton conducting membrane to the cathode, the proton conducting ceramic comprising the membrane may be a component of the cathode as a mixture.

It is the development of high temperature proton conducting membranes which makes use of ammonia directly as a fuel feasible. The physical configuration of the anode/membrane/cathode structure can be tubular or planar.

At 500° C., the enthalpy change for the partial oxidation reaction is −316.0 kJ, the entropy change is 34.74 J/K, and the free energy change is −342.9 kJ (calculated using HSC Chemistry. The disclosures of which are hereby incorporated herein by reference). For this reaction 3 electrons flow through the external circuit and so the open circuit voltage is 1.18 V. Over the temperature range 0 to 1000° C. the free energy varies from −325.7 to −359.7 kJ.

Alternate embodiments of this invention include using a molten carbonate or a solid oxide fuel cell. With a molten carbonate fuel cell $CO_3^{2-}$ ions diffuse through a molten carbonate membrane from the cathode to the anode. Reaction at the anode yields $N_2$, $H_2O$ and $CO_2$. The $CO_2$ must be recycled back to the cathode. With a direct ammonia solid oxide fuel cell, $O^{2-}$ diffuses through a ceramic membrane and reacts at the anode yielding $N_2$ and $H_2O$. In this case, at high temperature production of nitrogen oxides or nitric acid might be undesirable by-products.

This invention will be further, but not exclusively, explained with reference to FIGS. 1 and 2 and examples and comparative examples.

FIG. 1 shows a preferred embodiment of the ammonia fuel cell (1) for generating electrical energy. The fuel cell (1) has an entrance (2) for ammonia. Ammonia flows as shown in FIG. 1 directly to a combined decomposition catalyst and catalytic anode (34), where ammonia decomposes to $N_2$ and $H_2$:

(Decomposition Catalyst (34))

where H(a) represents a hydrogen atom adsorbed on the catalyst surface. The combined catalyst and anode further ionizes the adsorbed H-atoms into $H^+$-ions (i.e. protons) and electrons:

(Catalytic Anode (34))

Nitrogen gas exits the fuel cell (1) through the exit (12). The catalytic anode (34) is supported by a high temperature proton conducting ceramic membrane (5). The protons diffuse through the membrane toward a catalytic cathode (7). The electrons flow to an external circuit (6). The external circuit (6) is connected between the catalytic anode and the catalytic cathode (7). The diffused protons from the catalytic anode, electrons from the external circuit (6) and oxygen, from air as the oxygen source (9) react at the catalytic cathode (7) to form water (8).

(Catalytic Cathode (7))

The external circuit includes a load (10) to which power is applied. Ammonia is stored in a storage container (11) easily at high density of <10 bar ($10^6$ Pa).

FIG. 2 shows an alternative embodiment of the invention wherein ammonia flows directly to a decomposition catalyst (3), where ammonia decomposes to $N_2$ and $H_2$:

(Decomposition Catalyst (3))

$H_2$ leaves the decomposition catalyst (3) and interacts with the catalytic anode (4) and dissociates $H_2$ into H-atoms and further ionizes H-atoms into $H^+$-ions (i.e. protons) and electrons:

$$\frac{3}{2}H_2 \rightarrow 3H^+ + 3e^-.$$ (Catalytic Anode (4))

Nitrogen gas exits the fuel cell (1) through the exit (12). The catalytic anode (4) is supported by a high temperature proton conducting ceramic membrane (5). The protons diffuse through the membrane toward a catalytic cathode (7). The electrons flow to an external circuit (6). The external circuit (6) leads from the catalytic anode (4) to the catalytic cathode (7). The diffused protons from the catalytic anode, electrons from the external circuit (6) and oxygen, from air as the oxygen source (9) react at the catalytic cathode (7) to form water (8).

$$3H^+ + 3e^- + \frac{3}{4}O_2 \rightarrow \frac{3}{2}H_2O$$ (Catalytic Cathode (7))

The external circuit includes a load (10). Ammonia is stored in a storage container (11) easily at high density of <10 bar ($10^6$ Pa).

In both embodiments according to FIGS. 1 and 2 the potential is higher at the catalytic anode as at the catalytic cathode. The difference in the potential is equivalent to the potential of the load. The ammonia fuel cell uses available ammonia as the fuel. The formed products are nitrogen which leaves the fuel cell and water. Both nitrogen and water are considered ecologically harmless. This is a further advantage of the fuel cell of this invention.

The following table 1 represents the preferred embodiment according to this invention in examples 5 and 6. Examples 1 to 4 use comparative examples.

The gravimetric energy density of a direct ammonia fuel cell may be compared with a PEM $H_2/O_2$ fuel cell using the equivalent hydrogen storage density. Several examples are given in Table 1 for reaction at 25° C. The equivalent hydrogen storage density is calculated from the free energy change at 25° C. and therefore includes the thermodynamic stability of the fuel.

The equivalent hydrogen storage density is calculated from the free energy change at 25° C. as follows. Example 5 yields 325.7 kJ using 17 g of fuel. The energy density is 325.7 kJ/17 g=19.2 kJ/g. For the $H_2/O_2$ PEM fuel cell in example 1 the energy density is 114.3 kJ/g. The equivalent hydrogen storage density for example 5 is 19.2/114.3=0.168 or 16.8%.

EXAMPLE 1

Example 1 is a $H_2/O_2$ PEM fuel cell with hydrogen fuel. In this case the storage density, neglecting any container weight, is 100%. For hydrogen, the container or storage medium weight is significant with typical storage density including container weight of 1–10%. Storing hydrogen in a container as a liquid (at cryogenic temperatures) or as a compressed gas raises several problems in example 1. Energy is needed to liquify or compress hydrogen. This energy can be significant, up to 30% of the energy content of the stored hydrogen. Cryogenic storage of liquid hydrogen (about 25 K) presents many technologically difficult problems including safety and efficient transfer and achieving reasonably long dormancy. Compressed hydrogen employs pressures up to approximately 700 bar (70 MPa) which presents an important safety issue. Hydrogen can also be stored in a media such as metal hydrides. In this case, the weight of (currently) available practical media limits the effective storage density not including the weight of the tank to less than approximately 8 weight percent.

EXAMPLES 2 AND 2a

Examples 2 and 2a are direct methanol PEM fuel cells. To use methanol directly in a PEM fuel cell one equivalent of water must be mixed with each equivalent of methanol ($CH_3OH+H_2O$) to enable reforming to occur at the anode. If all of the water needed is stored, the equivalent density is approximately 12%. In the event that no water is stored but rather is recovered from the cathode exhaust of the fuel cell, the density increases to approximately 19%. Direct methanol fuel cells are (currently) problematic because methanol is soluble in water that is present in the proton exchange membrane. Methanol can, therefore, cross-over from the anode to the cathode reducing the efficiency of the fuel cell. In addition, methanol's toxicity and solubility in rain and ground water make widespread use of methanol a public health concern.

EXAMPLES 3 AND 3a

A similar need for water occurs for a PEM $H_2/O_2$ fuel cell operated on reformed gasoline (octane) as shown in Examples 3 and 3a. In this case reforming cannot be done at the anode but is performed in a separate reactor. Utilizing exhaust water results in a (theoretically limiting) density of 40%. The estimated density does not include the weight of

TABLE 1

| Ex. | Overall Reaction | Free Energy Change at 25° C. (kJ) | Fuel Composition | Gram Equivalent Fuel Mass (g) | Equivalent Hydrogen Storage Density |
|---|---|---|---|---|---|
| 1 | $H_2 + 1/2 O_2 = H_2O$ | −228.6 | $H_2$ | 2 | 100% |
| 2 | $CH_3OH + 3/2 O_2 = CO_2 + 2 H_2O$ | −689.1 | $CH_3OH + H_2O$ | 50 | 12.1% |
| 2a | $CH_3OH + 3/2 O_2 = CO_2 + 2 H_2O$ | −689.1 | $CH_3OH$ | 32 | 18.8% |
| 3 | $C_8H_{18} + 25/2 O_2 = 8 CO_2 + 9 H_2O$ | −5228.9 | $C_8H_{18} + 16 H_2O$ | 402 | 12.4% |
| 3a | $C_8H_{18} + 25/2 O_2 = 8 CO_2 + 9 H_2O$ | −5228.9 | $C_8H_{18}$ | 114 | 40.1% |
| 4 | $C_4H_{10} + 13/2 O_2 = 4 CO_2 + 5 H_2O$ | −2703.4 | $C_4H_{10}$ | 58 | 40.8% |
| 5 | $NH_3 + 3/4 O_2 = 1/2 N_2 + 3/2 H_2O$ | −325.7 | $NH_3$ | 17 | 16.8% |
| 6 | $N_2H_4 + O_2 = N_2 + 2 H_2O$ | −615.8 | $N_2H_4$ | 32 | 16.8% | the separate reforming reactor. This reactor is complex because the reforming reaction (gasoline+water) produces carbon monoxide, in addition to hydrogen. Carbon monoxide is a poison for PEM fuel cells and its concentration in the hydrogen must be reduced to <100 ppm. This reduction requires several stages of processing after the main reformation. These additional stages add complexity and reduce efficiency.

EXAMPLE 4

A solid oxide fuel cell operating on butane, example 4, also has a density of 40%. In this case a reforming reaction requiring water is not necessary because $O^{2-}$ ions diffuse through the membrane and directly oxidize the fuel. This type of fuel cell has been demonstrated, however, it is still at a research level. Poisoning of the anode from buildup of carbon char remains a problem.

EXAMPLES 5 AND 6

The direct ammonia fuel cell described in this invention is given in Example 5 and an alternate fuel for this invention in Example 6. Both fuels have similar hydrogen storage densities of approximately 16%. Gravimetrically, ammonia contains more hydrogen but hydrazine is less thermodynamically stable.

Let it be understood that the foregoing description is only illustrative of the invention. Various alternatives and modifications can be devised by those skilled in the art without departing from the spirit of the invention. Accordingly, the present invention is intended to embrace all such alternatives, modifications, and variances which fall within the scope of the appended claims.

I claim:

1. Ammonia fuel cell for generating electrical energy including a catalyst being in contact with a high temperature proton conducting membrane and the catalyst comprising at least one decomposition catalyst which causes $NH_3$ to decompose to $N_2$ and $H_2$ and at least one catalytic anode which dissociates and ionizes $H_2$ into $H^+$ and electrons, the fuel cell further including at least one catalytic cathode for reaction of $H^+$, electrons and oxygen to form $H_2O$, an external circuit from said catalytic anode to said catalytic cathode, an ammonia source for introducing ammonia into the fuel cell, a gas exit for $N_2$, and an oxygen source.

2. Ammonia fuel cell as claimed in claim 1, wherein said catalyst which causes $NH_3$ to decompose to $N_2$ and $H_2$ and said catalyst which dissociates and ionizes $H_2$ into $H^+$ and electrons is a combined catalyst comprising a decomposition catalyst and a catalytic anode.

3. Ammonia fuel cell as claimed in claim 1, wherein the membrane is a ceramic membrane.

4. Ammonia fuel cell as claimed in claim 1, wherein the external circuit includes a load.

5. Ammonia fuel cell as claimed in claim 1, wherein ammonia is stored in a storage container at high density at <10 bar ($10^6$ Pa).

6. Ammonia fuel cell as claimed in claim 1, wherein the oxygen source is air.

7. Process of generating electrical energy in an ammonia fuel cell, wherein (a) ammonia flows to a decomposition catalyst being in contact with a high temperature proton conducting membrane, (b) ammonia decomposes to nitrogen and hydrogen, (c) hydrogen atoms dissociate into electrons and protons, (d) nitrogen gas exits the fuel cell, (e) the electrons flow to an external circuit, (f) the protons diffuse to a catalytic cathode where water is formed.

8. Process of generating electrical energy in an ammonia fuel cell as claimed in claim 7, wherein process steps (b) and (c) are carried out in one single step.

9. Process of generating electrical energy in an ammonia fuel cell as claimed in claim 7, wherein water is formed at the cathode by reaction of oxygen, from an air or oxygen source, with the diffusing protons and electrons from the external circuit.

10. Process of generating electrical energy in an ammonia fuel cell as claimed in claim 7, wherein the external circuit includes a load.

11. Process of generating electrical energy in an ammonia fuel cell as claimed in claim 7, wherein ammonia is stored in a storage container at high density at <10 bar ($10^6$ Pa).

12. Process of generating electrical energy in an ammonia fuel cell as claimed in claim 7, wherein, renewably produced, ammonia yields a non-carbon based energy cycle.

13. Process of generating electrical energy in an ammonia fuel cell as claimed in claim 7, wherein the membrane is a ceramic membrane.

* * * * *